(12) United States Patent
Prabhu et al.

(10) Patent No.: US 10,057,070 B2
(45) Date of Patent: Aug. 21, 2018

(54) SECURE ACCESS CONTROL TO AN EMBEDDED DEVICE THROUGH A NETWORKED COMPUTER

(71) Applicants: Robert Bosch Tool Corporation, Broadview, IL (US); Robert Bosch GmbH, Stuttgart (DE)

(72) Inventors: Triveni Prabhu, Bangalore (IN); Reshma Hanamantharaddi Neelaraddi, Bangalore (IN); Debojyoti Bhattacharya, Bangalore (IN); Niranjan Sathyanarayanarao Krishnarao, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 114 days.

(21) Appl. No.: 15/352,946

(22) Filed: Nov. 16, 2016

(65) Prior Publication Data

US 2017/0149569 A1    May 25, 2017

(30) Foreign Application Priority Data

Nov. 19, 2015 (IN) .......................... 6238/CHE/2015

(51) Int. Cl.
*G06F 21/60* (2013.01)
*H04L 9/32* (2006.01)
*H04L 29/06* (2006.01)

(52) U.S. Cl.
CPC .......... *H04L 9/3247* (2013.01); *H04L 63/105* (2013.01)

(58) Field of Classification Search
CPC ......... H04L 63/08; G06F 21/60; G06F 21/64; G06F 21/44
See application file for complete search history.

(56) References Cited

U.S. PATENT DOCUMENTS

| 7,552,467 | B2 | 6/2009 | Lindsay |
| 2002/0116550 | A1* | 8/2002 | Hansen ............. G06F 17/30861 |
| | | | 719/330 |
| 2005/0010786 | A1 | 1/2005 | Michener et al. |
| 2008/0228985 | A1 | 9/2008 | Gulick |

(Continued)

FOREIGN PATENT DOCUMENTS

| EP | 1775673 A2 | 4/2007 |
| EP | 2658204 A1 | 10/2013 |

(Continued)

OTHER PUBLICATIONS

International Search Report and Written Opinion corresponding to PCT Application No. PCT/US2016/062241, dated Feb. 23, 2017 (10 pages).

*Primary Examiner* — Izunna Okeke
(74) *Attorney, Agent, or Firm* — Maginot Moore & Beck LLP

(57) ABSTRACT

A method for secure access control to a power tool enables secure access to an embedded computing device in the power tool from a web application in another computer that is connected to the power tool via a USB or other suitable peripheral data connection in a workshop environment. The access control enables authorized parties to perform repair and diagnostic procedures on the power tools based on specific user roles while denying access to unauthorized parties.

13 Claims, 3 Drawing Sheets

(56) References Cited

U.S. PATENT DOCUMENTS

| | | | |
|---|---|---|---|
| 2009/0022325 A1* | 1/2009 | Naedele | H04L 63/0442 380/282 |
| 2011/0078773 A1 | 3/2011 | Bhasin et al. | |
| 2012/0280790 A1* | 11/2012 | Gerhardt | G07C 9/00309 340/5.61 |
| 2015/0058637 A1 | 2/2015 | Raskin et al. | |
| 2015/0121086 A1 | 4/2015 | Smith et al. | |

FOREIGN PATENT DOCUMENTS

| | | |
|---|---|---|
| WO | 03010927 A1 | 2/2003 |
| WO | 2008079491 A2 | 7/2008 |
| WO | 2008155597 A1 | 12/2008 |

* cited by examiner

SECURE ACCESS CONTROL TO AN EMBEDDED DEVICE THROUGH A NETWORKED COMPUTER

CLAIM OF PRIORITY

This application claims priority to Indian Provisional Application No. 6238/CHE/2015, which is entitled "SECURE ACCESS CONTROL TO AN EMBEDDED DEVICE THROUGH A NETWORKED COMPUTER," and was filed on 19 Nov. 2015, the entire contents of which are hereby expressly incorporated herein by reference.

FIELD

This disclosure relates generally to the field of embedded computing systems and, more particularly, to access control for power tools that receive commands from computers using a universal serial bus (USB) or other peripheral connection.

BACKGROUND

Many power tools do not have capabilities to send data over full data networks using, for example, the IP and TCP or UDP data protocols that enable end-to-end communication over a data network. Instead, the power tools only include local peripheral connections including, for example, universal serial bus (USB), RS-232 and RS-485 serial lines, infrared, point-to-point wireless, and other suitable peripheral connections that enable direct communication between an embedded computing system in the power tool and another computer, such as a PC. While the power tool is not typically treated as a computer, the computing system in the power tool is referred to as an "embedded device" that receives commands from an external computer and performs maintenance and diagnostic functions based on the commands. In a connected workshop where certain commands have to be run on the embedded device and data from the embedded device is accessed via a data network. The access occurs through an intermediate client computing system, such as a PC, which is connected to the embedded device over USB or another peripheral connection.

One problem with existing embedded devices is that access to the embedded devices from a networked client computer often violates security policies. For example, many client computers are connected to a data network and run web browsers or other networked programs that provide potential vectors for malicious parties to control the client computer and to send unauthorized commands to the embedded device in the power tool. In general, the embedded system in the power tool cannot be preconfigured to only execute certain commands while not executing other commands at the time of manufacture because of the wide range of potential functions required for different maintenance and diagnostic procedures.

Another problem is that a user needs to have specific access to the device depending on the user role. On server side the user role can be mapped easily. However, mapping the same user role to the embedded device can be quite complex. Unless the user roles are mapped, the access to the embedded system becomes quite open and insecure. The data available in each of these power tools have to be read and stored safely on the server to enable troubleshooting, data analytics and reporting. Consequently, improvements to access control systems to ensure that an embedded device performs only authorized commands without reducing the functionality of the embedded device in a configuration where the embedded device is only directly accessible via USB or another peripheral connection would be beneficial.

SUMMARY

A two-way secure communication protocol enables access control to an embedded system in a power tool from a client computing device that is connected to the power tool via a USB or other peripheral connection device. The client computing device communicates with a remote server via a data network. The server authorizes requested commands for the embedded device to execute based on the user role and the embedded computing device only executes command requests from the client computing device in response to authorized command(s) from the server. The embedded device and server remain involved actively throughout the communication without which the communication link is broken and this two-way communication ensures that device performs only specific, authorized actions. Additionally this design enables role specific access to the embedded device with help of the server.

The system that establishes secure communication with USB-only enabled embedded devices. The system hides the details of the commands and authenticates the commands being sent to the embedded device. The system ensures that correct commands are sent to the embedded device each time. The system ensures that only user role specific commands can be sent to the embedded device, in which case the roles are mapped per user id at the server side.

In one embodiment, an embedded computing device has been developed. The embedded computing device includes a peripheral interface device communicatively connected to a client computing device through a peripheral connection, a memory configured to store a cryptographic key, and a processor operatively connected to the peripheral interface device and the memory. The processor is configured to receive a first response message forwarded from the client computing device through the peripheral connection with the peripheral interface device, the first response message including a unique command identifier received from a server computing device external to the client computing device and not directly connected to the embedded computing device, generate a counter value, transmit a second response message including the counter value and the unique command identifier to server computing device via the client computing device through the peripheral connection with the peripheral interface device, receive a command message generated by the server computing device from the client computing device through the peripheral connection with the peripheral interface device, the command message including command data and a cryptographic signature corresponding to the unique command identifier, the counter, and the command data, and perform a requested operation based on the command data in the command message only in response to verification that the cryptographic signature corresponds to the counter value, the unique command identifier, and the command data using the cryptographic key.

In a further embodiment, the embedded computing device is operatively connected to an actuator in a power tool and the processor is further configured to perform the requested operation based on the command data to operate the actuator.

In a further embodiment, the processor is further configured to perform the verification that the cryptographic signature corresponds to the counter value, the unique command identifier, and the command data using a symmetric cryptographic key stored in the memory.

In a further embodiment, the processor is further configured to perform the verification that the cryptographic signature corresponds to the counter value, the unique command identifier, and the command data using a public cryptographic key stored in the memory, the public cryptographic key corresponding to a private cryptographic key stored in a memory of the server computing device.

In a further embodiment, the processor is further configured to generate a third response message including the unique command identifier, the counter, and return data generated in response to the requested operation, and transmit the third response message to the server computing device via the client computing device through the peripheral connection with the peripheral interface device.

In another embodiment, a method of operating an embedded computing device has been developed. The method includes receiving, with a peripheral interface device in the embedded computing device, a first response message forwarded from a client computing device through a peripheral connection to the peripheral interface device, the first response message including a unique command identifier received from a server computing device external to the client computing device and not directly connected to the embedded computing device, generating, with a processor in the embedded computing device, a counter value, transmitting, with the peripheral interface device, a second response message including the counter value and the unique command identifier to server computing device via the client computing device through the peripheral connection, receiving, with the peripheral interface device, a command message generated by the server computing device from the client computing device through the peripheral connection with the peripheral interface device, the command message including command data and a cryptographic signature corresponding to the unique command identifier, the counter, and the command data, and performing, with the processor, the requested operation based on the command data in the command message only in response to verification that the cryptographic signature corresponds to the counter value, the unique command identifier, and the command data using a cryptographic key stored in a memory of the embedded computing device.

In a further embodiment, the method includes operating, with the processor, an actuator in a power tool to perform the requested operation based on the command data.

In a further embodiment, the method of verification further includes performing, with the processor, the verification using a symmetric cryptographic key stored in the memory.

In a further embodiment, the method of verification further includes performing, with the processor, the verification using a public cryptographic key corresponding to a private cryptographic key stored in a memory of the server computing device.

In a further embodiment, the method includes generating, with the processor, a third response message including the unique command identifier, the counter, and return data generated in response to the requested operation, and transmitting, with the processor, the third response message to the server computing device via the client computing device through the peripheral connection with the peripheral interface device.

In another embodiment, a system for control of an embedded computing device has been developed. The system includes a client computing device communicatively connected to a server computing device through a network and an embedded computing device through a peripheral connection. The client computing device includes a network interface device, a first peripheral interface device, device, and a first processor operatively connected to the network interface device and the peripheral interface device. The first processor is configured to transmit a request message for an operation of the embedded computing device to the server computing device through the network with the network interface device, forward a first response message received from the server computing device through the network with the network interface device to the embedded computing device through the peripheral connection with the first peripheral interface device, the first response message including a unique command identifier corresponding to the operation in response to the request message, forward a second response message received from the embedded computing device through the peripheral connection with the first peripheral interface device to the server through the network using the network interface device, the second response message including a counter value from the embedded computing device and the unique command identifier, and forward a command message received from the server computing device through the network with the network interface device to the embedded computing device through the peripheral connection with the first peripheral interface device, the command message including a cryptographic signature corresponding to the unique command identifier, the counter value, and command data to enable the embedded device to perform the operation in the request message. The embedded computing device is communicatively connected to the client computing device through the peripheral connection and not directly connected to the network. The embedded computing device includes a second peripheral interface device communicatively connected to the first peripheral interface device in the client computing device, a memory configured to store a cryptographic key, and a second processor operatively connected to the second peripheral interface device and the memory. The second processor is configured to receive the first response message forwarded from the client computing device through the peripheral connection with the second peripheral interface device, generate the counter value, transmit the second response message including the counter value and the unique command identifier to the client computing device through the peripheral connection with the second peripheral interface device, receive the command message from the client computing device through the peripheral connection with the second peripheral interface device, and perform the requested operation based on the command data in the command message only in response to verification that the cryptographic signature corresponds to the counter value, the unique command identifier, and the command data using the cryptographic key.

In a further embodiment, the embedded computing device in the system is operatively connected to an actuator in a power tool and the second processor is further configured to perform the requested operation based on the command data to operate the actuator.

In a further embodiment, the second processor is configured to perform the verification that the cryptographic signature corresponds to the counter value, the unique command identifier, and the command data using a symmetric cryptographic key stored in the memory.

In a further embodiment, the second processor is configured to perform the verification that the cryptographic signature corresponds to the counter value, the unique command identifier, and the command data using a public cryptographic key stored in the memory, the public cryptographic key corresponding to a private cryptographic key stored in a memory of the server computing device.

In a further embodiment, the second processor is configured to generate a third response message including the unique command identifier, the counter, and return data generated in response to the requested operation, and transmit the third response message to the server computing device via the client computing device through the peripheral connection with the peripheral interface device.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The disclosure also includes any alterations and modifications to the illustrated embodiments and includes further applications of the principles of the disclosed embodiments as would normally occur to one skilled in the art to which this disclosure pertains.

Figure 1:
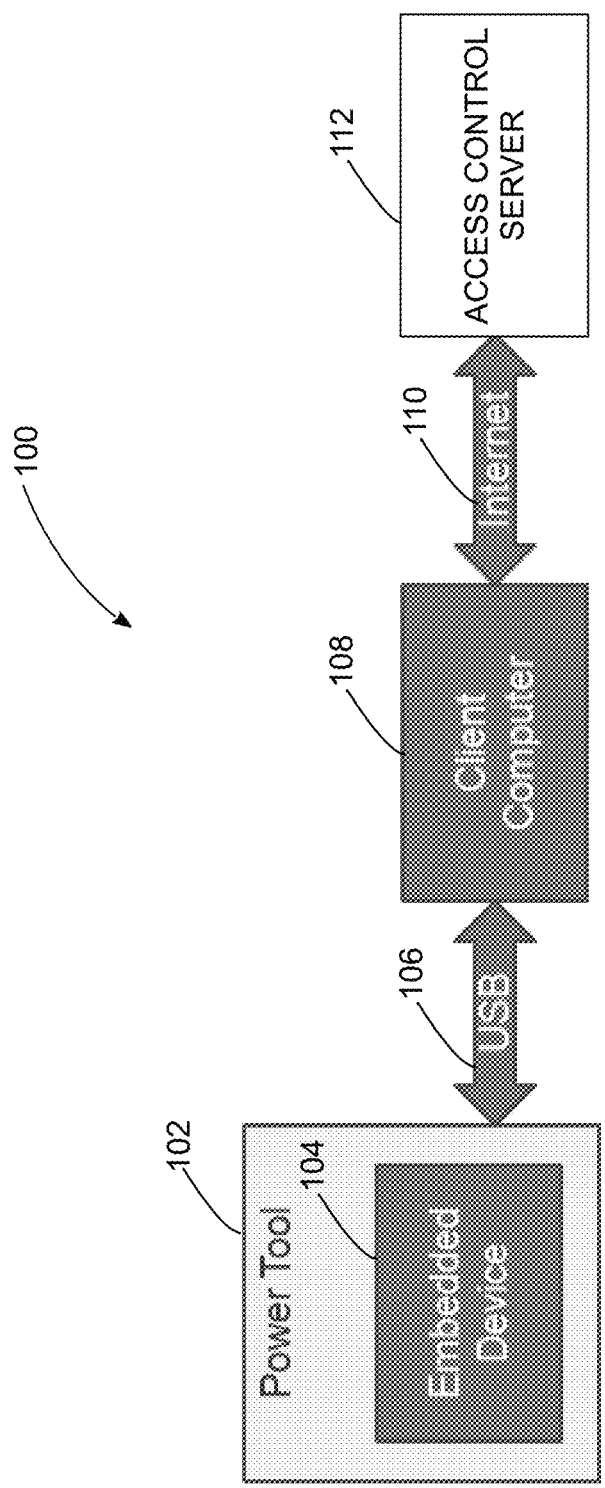
FIG. 1 is a schematic diagram of system that performs access control and command operations with an embedded device in a power tool that is connected to a client computing system and where the client computing system communicates with a server via a data network.

FIG. 1 depicts a system 100 that performs access control for the operations of an embedded computing device 104 in a power tool 102. The system 100 includes the power tool 102, a client computing device 108, and an access control server computing device 112. The embedded computing device 104 is connected to the client computing device 108 using a peripheral connection 106, which is embodied as a universal serial bus (USB) connection in FIG. 1. In addition to USB, examples of peripheral connections include, but are not limited to, RS-232 and RS-485 serial connections, IEEE 1284 parallel port connections, I²C, Serial Peripheral Interface (SPI) bus, Joint Test Action Group (JTAG) connections, infrared, and short-range radio peripheral connections. In the system 100, the embedded computing device 104 and the client computing device each include a peripheral interface device that sends and receives data using the peripheral connection. Each peripheral interface device typically includes a transceiver in the client computing device 108 and another transceiver in the embedded device, such as the embedded computing device 104 in the power tool 102, with a cable to provide a physical communication medium in wired peripheral interface devices or an antenna or exposed transceiver sensor for wireless peripheral interface devices. The embedded computing device 104 is connected to the client computing device 108 through the peripheral connection 106, but the embedded computing device 104 is not directly connected to the server 112. The client computing device 108, in turn, includes a network interface device such as Ethernet or a wireless networking device that enables communication between the client computing device 108 and the server computing device 112.

In the system 100, the power tool 102 may be a circular saw, a table saw, a miter saw, a reciprocating saw, a jig saw, a jab saw, a drill, a band saw, a screw driver, an angle driver, a grinder, a hammer, an impact wrench, an oscillating tool, a cutter, a pneumatic tool, a rotary tool, or the like. Other non-power tools that uses at a job site may be a laser level, a distance meter, a thermal tool, a moisture meter, a wall scanner, a job-site audio power box, a container/vessel for storing power tool accessories and attachments, a stand for a power saw device, or the like with an embedded computing device 104 that is capable to connect the non-power tool to the client computing device 108 are possible.

Although FIG. 1 illustrates a single power tool 102 for simplicity, in many embodiments multiple power tools, including multiple instances of a single type of power tool and different types of power tools, communicate with the server computing device 112 using one or more of the client computers 108. The client computing device 108 is communicatively coupled to the access control server computing device 112 through a data network 110, such as the Internet or another suitable local area network (LAN) or wide area network (WAN). The client computing device 108 includes a network interface device, such as a wired Ethernet adapter or a wireless network adapter that uses an IEEE 802.11 wireless LAN protocol or a wireless WAN protocol to communicate with the server computing device 112 through the network 110.

In one example, more than one client computing device 108 is communicatively coupled to the server computing device 112. The client computing device 108 is a type of computing device known to one of ordinary skill in the art that is capable of executing a set of computer instructions over various types of network environment. The client computing device 108 is, for example, a personal computer (PC), a tablet computing device, a personal digital assistant (PDA), a mobile phone, a web appliance, a wearable device, or the like. It is to be appreciated that the embodiment described herein is not restricted to LAN or WAN communicating architecture but rather may apply to any architecture including cloud computing architecture. In the system 100, the embedded computing device 104 only has direct communication access with the client computing device 108 through the USB connection 106, and the client computing device 108 acts as an intermediary to provide indirect communication between the embedded computing device 104 and the access control server computing device 112. While FIG. 1 depicts the server computing device 112 as a web server that performs user authentication and access control authorization based on communications from a web browser client program executed by the client computing device 108, alternative embodiments of the server computing device 112 can implement the user authorization and access control functionality within a framework other than a web server.

During operation, the client computing device 108 may be compromised by a malicious party and the embedded computing device 104 only performs commands from the client computing device 108 if the commands are expressly authorized by the access control server computing device 112. In the embodiment of FIG. 1, the client computing device 108 executes a web browser program to communicate with a web server that the access control server computing device 112 provides as an interface to the client computing device 108. In alternative embodiments, the client computing device 108 and access control server computing device 112 communicate using a different client/server communication protocol.

In the system 100, the access control server computing device 112 receives requests from users via the client computing device 108 and handles the process of performing user authentication and access control authorization for different operations that the embedded computing device 104 performs, such as activation or deactivation of the power tool 102 and other operations in embedded devices. The embedded computing device 104, in turn, performs operations based on authenticated commands from the server computing device 112 and not based on direct commands that are received from the server. In the system 100, the embedded computing device 104 does not include a sophisticated operating system with the same access control features that are common in personal computers such as the client computing device 108 or the server computing device 112. However, the system 100 still enables authentication and access control for the embedded computing device 104 even though the embedded computing device 104 does not implement the standard prior art user authentication and access control features.

Figure 3:
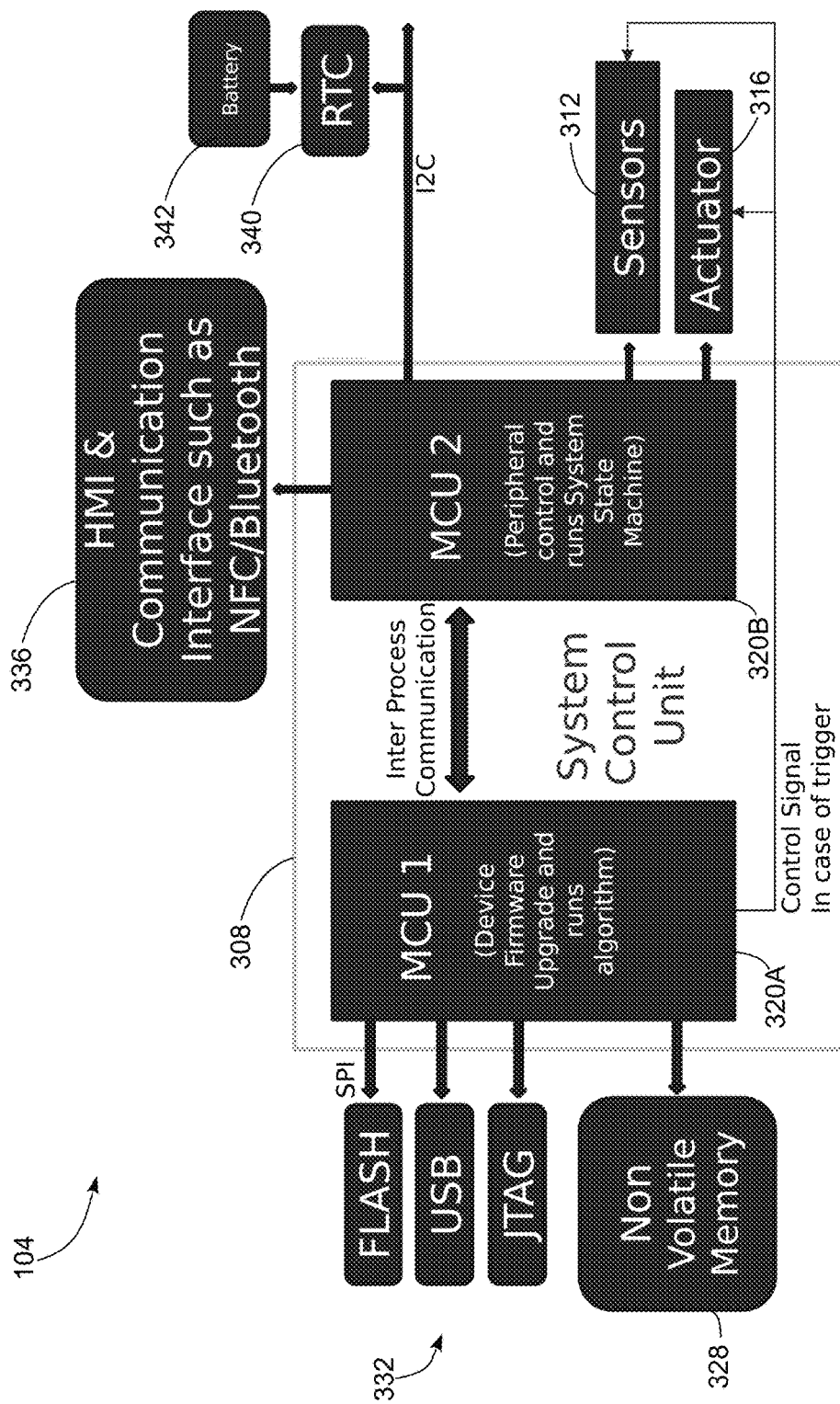
FIG. 3 is a schematic diagram of the client computing system depicted in FIG. 1.

FIG. 3 depicts the embedded computing device (ECD) 104 in more detail. FIG. 3 depicts the ECD, including a system control unit 308 which controls operation of the actuator 312 and one or more sensors 316 in the power tool 102 of FIG. 1. The ECD 104 also includes a non-volatile memory device 328 that stores program instructions and other data used to operate the ECD 104, at least one peripheral interface device depicted as input-output (I/O) interfaces 332, human machine interface (HMI) and other short-range wireless interfaces 336 such as near field communication (NFC) and Bluetooth interfaces, and a real-time clock (RTC) 340 with an independent battery 342. The ECD 104 is connected to one or more of the sensors 312 and the actuator 316 (e.g. an electric motor or any other components in the power tool 102 that are controlled electronically) in the power tool 102. In addition to the non-volatile memory device 328, the system control unit 308 includes one or more volatile random access memory (RAM) devices that are either embedded within the system control unit 308 or are connected to the system control unit 308 via an external memory interface.

The ECD 104 implements one or more digital microcontroller units (MCUs) to read, write, store and calculate or compute any information required for operation of the power tool. In the example of FIG. 3, the system control unit 308 further includes a first MCU 320A and a second MCU 320B. The first MCU 320A controls execution of software and firmware instructions from the non-volatile memory 328 to implement the methods described below for access control to operation of the power tool 102. During operation, MCU1 sends and receives information via one or more input/output interfaces 332 including a FLASH connection via an SPI bus, a USB peripheral interface, and JTAG interface. In particular, one or more of the interfaces 332 enable the MCU 320A to communication with the client computing device 108 via the USB interface or another suitable peripheral interface to perform indirect communication with the access control server computing device 112 and receive executable program data for operation of the power tool 102.

The second MCU 320B implements an internal state machine to control the operation of the power tool 102 and to perform operations based on one or more command instructions that are received from the HMI interface 336. As described in more detail below, the MCU 320B only executes operations using stored program instructions that are either present by default in the non-volatile memory 328 or instructions that the MCU 320A receives from the access control server computing device 112 for limited-access functionality. Otherwise, the second MCU 320B does not perform the operation and the MCU 320B optionally generates an output message via the HMI 336 to indicate that certain unauthorized operations cannot be executed. In FIG. 3, the MCUs 320A and 320B communicate with each other using, for example, a shared cache if both MCUs are implemented in a single silicon device or an on-package bus when both MCUs are mounted to a printed circuit board (PCB) or other suitable substrate.

While FIG. 3 depicts one illustrative embodiment of an embedded computing device that is suitable for use in the power tool 102, those of skill in the art will recognize that a wide range of digital processing devices may be incorporated in the power tool 102 in additional embodiments. For example, in alternative configurations another processor with one or more processing cores implements the functionality of the system control unit 308. Additionally, alternative embodiments may use different I/O device implementations to implement the functionality of the I/O devices 332 shown in FIG. 3.

Figure 2:
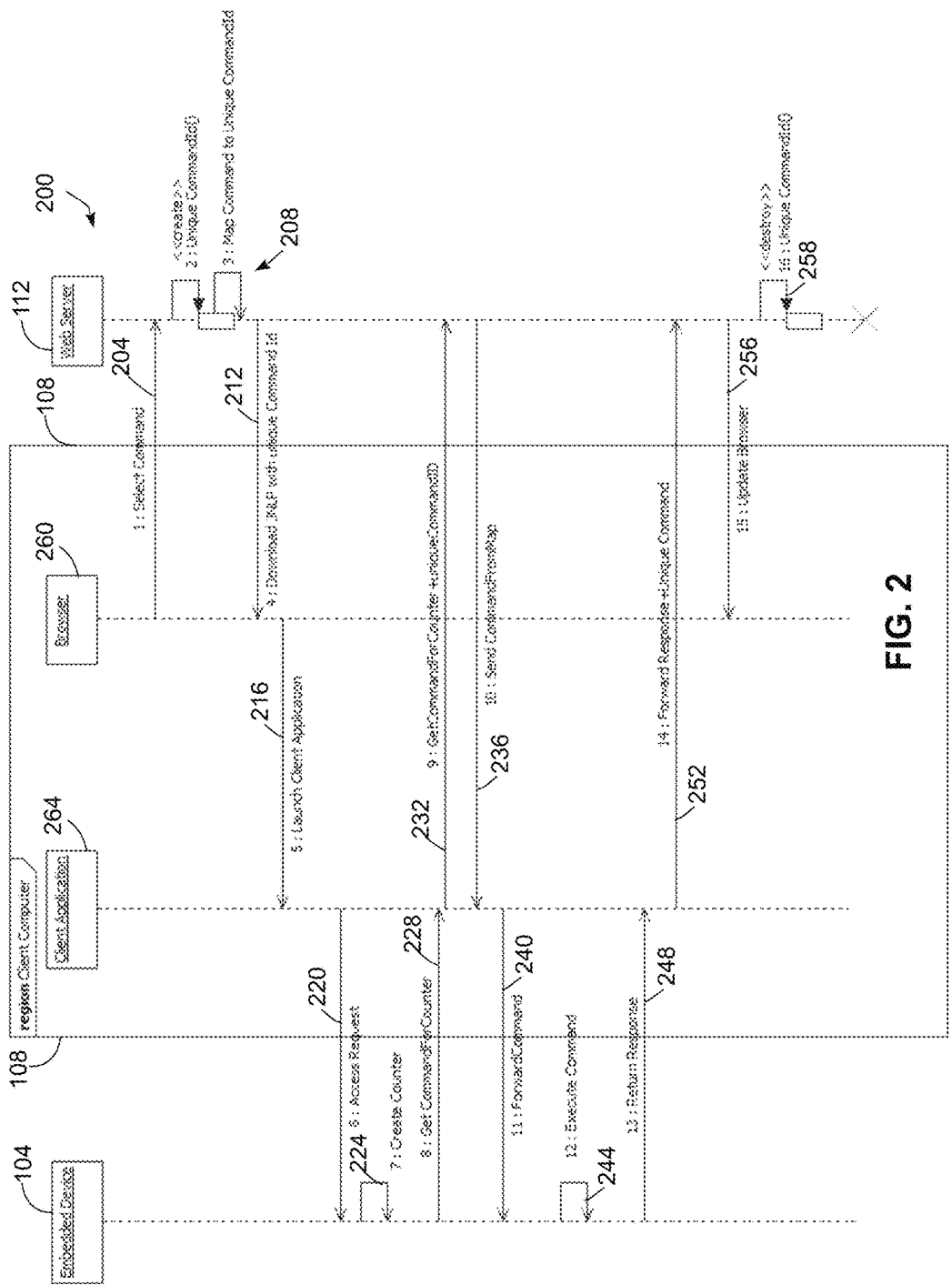
FIG. 2 is a diagram of an access control process in the system of FIG. 1.

FIG. 2 depicts a process 200 for performing authentication and authorization operations with the embedded computing device 104 in the system 100. The process 200 includes the power tool 102 with embedded computing device 104, client computing device 108, and access control server (web server) 112 of FIG. 1 and FIG. 3 for illustrative purposes. In the process 200 the client computing device 108 executes both a web browser 260 and a client application 264. The web browser 260 communicates with the web server computing device 112 and the client application 264 communicates with the embedded computing device 104.

During process 200, the user of the client system in a connected workshop uses the browser 260 to send a command to the server (204). The browser 260 may include, but are not limited to, Windows Internet Explorer (IE), Mozilla Firefox, Apple Safari, Google Chrome, Opera, Internet Explorer Mobile (IE), iB5, WebOS, Opera Mobile, or the like. The commands available to the user which are shown in the web server computing device 112 are specific to the role of the user, and the user authenticates himself or herself with the web server computing device 112 prior to commencement of the process 200.

The process 200 continues as the web server computing device 112 generates a unique command identifier, which is a random number in one embodiment of the process 200, and maps the selected command from the client system 108 to the unique command identifier (208). The web server computing device 112 generates executable code for the client system 108 that provides the selected command with the unique command identifier (ID) to the embedded system 104 (212). In the embodiment of FIG. 2, the web server generates the executable code as a dynamic Java Network Launch Protocol (JNLP) file at runtime with the unique command identifier. The client system 108 executes the JNLP application to implement the client application 264 residing locally on the client system 108 (216). While the embodiment of FIG. 2 describes the use of the JNLP to implement the client application, alternative embodiments employ different software transmission and execution techniques to enable the client computing device 108 to execute the program that sends authorized commands to the embedded computing device 104 in the power tool 102. More broadly, the downloaded JNLP application or other data from the server computing device 112 forms a first response message including the unique command identifier that the server computing device 112 transmits to the client computing device 108 if the server computing device 112 approves a user request from the client computing device 108.

During the process 200, the local client application 264 forwards the first response message from the server computing device 112 as an access request to the embedded computing device 104 (220). In the client computing device 108, the first processor transmits the first response message to the embedded computing device 104 via the peripheral connection using the peripheral interface device in the client computing device 108. The embedded computing device 104 receives the first response message forwarded from the client computing device through the peripheral connection with the peripheral interface device in the embedded computing device 104, the first response message includes the unique command identifier received from the server computing device 112 that is external to the client computing device and is not directly connected to the embedded computing device.

The processor in the embedded computing device 104 generates a counter for the access request (224) and sends the counter back to the local client application 264 for the local client application to send a request to the server to get the command for unique counter and unique command identifier (228). In the embedded computing device 104, the processor transmits a second response message including the counter value and the unique command identifier to server computing device 112 via the client computing device 108 through the peripheral connection with the peripheral interface device in the embedded computing device. The processor in the client computing device 108 forwards the second response message received from the embedded computing device through the peripheral connection with the first peripheral interface device to the server computing device through the network 110 using the network interface device. The second response message includes the counter value from the embedded computing device and the unique command identifier. The server computing device 112 receives the unique command identifier and counter from the client system 108 and verifies (compares) the unique command identifier previously sent in block 212 and the unique command identifier received from the client system 108 (232).

The counter enables the embedded computing device 104 to identify each access request and prevent a so-called "replay attack" where an attacker sends a previously-executed valid command to the embedded computing device 104 without proper authorization after the embedded computing device 104 had already executed the command. The embedded computing device 104 identifies the old counter value and rejects the command even if the command is accompanied by a valid cryptographic signature that the attacker copies from the previous execution of the command.

The server computing device 112 responds with a command message including details for a command, such as a machine-readable encoding of the command and parameters for the command, if the verification is successful (236). The processor in the client computing device 108 receives the command message with the network interface device and forwards the command message to the embedded computing device 104 through the peripheral connection device. The embedded computing device 104 receives the command message from the client computing device 108 via the peripheral connection using the peripheral connection device and the processor in the embedded computing device 104 verifies a cryptographic signature in the command message that corresponds to the unique command identifier, counter, and the command message data using a cryptographic key (240). In one embodiment of the system 100, the memory 328 in the embedded computing device 104 stores a symmetric cryptographic key that is a unique shared secret key stored in each embedded device and that is shared with the server computing device 112 but not the client computing device 108. In another embodiment, the web server computing device 112 signs the command using a private signing key and the memory 328 in the embedded computing device 104 stores a corresponding public key in an internal memory that the embedded computing device 104 uses to verify the cryptographic signature.

The processor in the embedded computing device 104 only in response to successful verification of the cryptographic signature in the command message (244). Successful verification means that the cryptographic signature in the command message, which can only be generated by the server 112, corresponds to each of the unique command identifier, counter, and the command message data elements of the command message. Successful verification means that the client computing device 108 or another third party did not tamper with the original command message that the server computing device 112 transmitted to the client computing device 108. As noted above, the embedded computing device 104 verifies the counter value received with the command and verifies the digital signature or the command authentication code to ensure that the command is valid prior to execution of the command. The processor in the embedded computing device 104 performs the requested operation in the command message based on the command data in the command message only in response to verification that the cryptographic signature corresponds to the counter value, the unique command identifier, and the command data using the cryptographic key. For example, upon successful verification of the command message the embedded computing device 104, which is operatively connected to an actuator in the power tool 102 in one embodiment, is further configured to perform the requested operation based on the command data to operate the actuator in the power tool 102.

Many types of command generate response data. The embedded computing device 104 forwards the response of the command to local client application 264 that is executed by the processor in the client computing device 108 (248). In the system 100, the processor in the embedded computing device 104 generates a third response message including the unique command identifier, the counter, and the return data generated in response to the requested operation. The embedded computing device 104 transmits the third response message to the server computing device via the client computing device through the peripheral connection with the peripheral interface device. The local client 264 forwards the response to the web server computing device 112 (252). The web server updates the user with the response using the browser 260 (256). The server destroys the unique command ID as the cycle is complete (258). During operation, the system 100 performs the process 200 one or more times to enable an authorized user to send one or more commands to the embedded computing device 104 during a maintenance or diagnostic procedure. The process 200 ensures that the embedded computing device 104 only performs authorized commands for the appropriate users of the system 100.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following embodiments.

What is claimed is:

1. An embedded computing device comprising:
a peripheral interface device communicatively connected to a client computing device through a peripheral connection;
a memory configured to store a cryptographic key; and
a processor operatively connected to the peripheral interface device and the memory, the processor being configured to:
receive a first response message forwarded from the client computing device through the peripheral connection with the peripheral interface device, the first response message including a unique command identifier received from a server computing device external to the client computing device and not directly connected to the embedded computing device;
generate a counter value;
transmit a second response message including the counter value and the unique command identifier to server computing device via the client computing device through the peripheral connection with the peripheral interface device;
receive a command message generated by the server computing device from the client computing device through the peripheral connection with the peripheral interface device, the command message including command data and a cryptographic signature corresponding to the unique command identifier, the counter, and the command data;
perform a requested operation based on the command data in the command message only in response to verification that the cryptographic signature corresponds to the counter value, the unique command identifier, and the command data using the cryptographic key;
generate a third response message including the unique command identifier, the counter, and return data generated in response to the requested operation; and
transmit the third response message to the server computing device via the client computing device through the peripheral connection with the peripheral interface device.

2. The embedded computing device of claim 1, wherein the embedded computing device is operatively connected to an actuator in a power tool and the processor is further configured to perform the requested operation based on the command data to operate the actuator.

3. The embedded computing device of claim 1, the processor being further configured to:
perform the verification that the cryptographic signature corresponds to the counter value, the unique command identifier, and the command data using a symmetric cryptographic key stored in the memory.

4. The embedded computing device of claim 1, the processor being further configured to:
perform the verification that the cryptographic signature corresponds to the counter value, the unique command identifier, and the command data using a public cryptographic key stored in the memory, the public cryptographic key corresponding to a private cryptographic key stored in a memory of the server computing device.

5. A method of operating an embedded computing device comprising:
receiving, with a peripheral interface device in the embedded computing device, a first response message forwarded from a client computing device through a peripheral connection to the peripheral interface device, the first response message including a unique command identifier received from a server computing device external to the client computing device and not directly connected to the embedded computing device;
generating, with a processor in the embedded computing device, a counter value;
transmitting, with the peripheral interface device, a second response message including the counter value and the unique command identifier to server computing device via the client computing device through the peripheral connection;
receiving, with the peripheral interface device, a command message generated by the server computing device from the client computing device through the peripheral connection with the peripheral interface device, the command message including command data and a cryptographic signature corresponding to the unique command identifier, the counter, and the command data;
performing, with the processor, the requested operation based on the command data in the command message only in response to verification that the cryptographic signature corresponds to the counter value, the unique command identifier, and the command data using a cryptographic key stored in a memory of the embedded computing device;
generating, with the processor, a third response message including the unique command identifier, the counter, and return data generated in response to the requested operation; and
transmitting, with the processor, the third response message to the server computing device via the client computing device through the peripheral connection with the peripheral interface device.

6. The method of claim 5 further comprising:
operating, with the processor, an actuator in a power tool to perform the requested operation based on the command data.

7. The method of claim 5, the verification further comprising:
performing, with the processor, the verification using a symmetric cryptographic key stored in the memory.

8. The method of claim 5, the verification further comprising:
performing, with the processor, the verification using a public cryptographic key corresponding to a private cryptographic key stored in a memory of the server computing device.

9. A system for control of an embedded computing device comprising:
a client computing device communicatively connected to a server computing device through a network and an embedded computing device through a peripheral connection, the client computing device further comprising:
a network interface device;
a first peripheral interface device; and a first processor operatively connected to the network interface device and the peripheral interface device, the first processor being configured to:
  transmit a request message for an operation of the embedded computing device to the server computing device through the network with the network interface device;
  forward a first response message received from the server computing device through the network with the network interface device to the embedded computing device through the peripheral connection with the first peripheral interface device, the first response message including a unique command identifier corresponding to the operation in response to the request message;
  forward a second response message received from the embedded computing device through the peripheral connection with the first peripheral interface device to the server computing device through the network using the network interface device, the second response message including a counter value from the embedded computing device and the unique command identifier;
  forward a command message received from the server computing device through the network with the network interface device to the embedded computing device through the peripheral connection with the first peripheral interface device, the command message including a cryptographic signature corresponding to the unique command identifier, the counter value, and command data to enable the embedded device to perform the operation in the request message; and
the embedded computing device communicatively connected to the client computing device through the peripheral connection and not directly connected to the network, the embedded computing device further comprising:
  a second peripheral interface device communicatively connected to the first peripheral interface device in the client computing device;
  a memory configured to store a cryptographic key; and
  a second processor operatively connected to the second peripheral interface device and the memory, the second processor being configured to:
    receive the first response message forwarded from the client computing device through the peripheral connection with the second peripheral interface device;
    generate the counter value;
    transmit the second response message including the counter value and the unique command identifier to the client computing device through the peripheral connection with the second peripheral interface device;
    receive the command message from the client computing device through the peripheral connection with the second peripheral interface device; and
    perform the requested operation based on the command data in the command message only in response to verification that the cryptographic signature corresponds to the counter value, the unique command identifier, and the command data using the cryptographic key.

10. The system of claim 9, wherein the embedded computing device is operatively connected to an actuator in a power tool and the second processor is further configured to perform the requested operation based on the command data to operate the actuator.

11. The system of claim 9, the second processor being further configured to:
  perform the verification that the cryptographic signature corresponds to the counter value, the unique command identifier, and the command data using a symmetric cryptographic key stored in the memory.

12. The system of claim 9, the second processor being further configured to:
  perform the verification that the cryptographic signature corresponds to the counter value, the unique command identifier, and the command data using a public cryptographic key stored in the memory, the public cryptographic key corresponding to a private cryptographic key stored in a memory of the server computing device.

13. The system of claim 9, the second processor being further configured to:
  generate a third response message including the unique command identifier, the counter, and return data generated in response to the requested operation; and
  transmit the third response message to the server computing device via the client computing device through the peripheral connection with the peripheral interface device.

* * * * *